United States Patent [19]
Bowman et al.

[11] Patent Number: 6,055,169
[45] Date of Patent: Apr. 25, 2000

[54] CURRENT MODE CONTROL CIRCUIT FOR PARALLELED POWER SUPPLY AND METHOD OF OPERATION THEREOF

[75] Inventors: Wayne C. Bowman, Allen; Feng Lin; Rui Liu, both of Plano, all of Tex.

[73] Assignee: Lucent Technologies Inc., Murray Hill, N.J.

[21] Appl. No.: 09/066,130

[22] Filed: Apr. 24, 1998

[51] Int. Cl.[7] .................................................. H02M 7/48
[52] U.S. Cl. ............................................. 363/65; 363/71
[58] Field of Search .................................. 363/58, 65, 67, 363/69, 70, 71

[56] References Cited

U.S. PATENT DOCUMENTS

| | | | |
|---|---|---|---|
| 4,663,702 | 5/1987 | Tanaka | 363/65 |
| 5,418,707 | 5/1995 | Shimer et al. | 363/65 |
| 5,712,540 | 1/1998 | Toda et al. | 363/58 X |

*Primary Examiner*—Jessica Han

[57] ABSTRACT

For use with a power supply including first and second parallel-coupled converters having interleaved first and second switches, respectively, the first and second switches limited to a duty cycle of less than about 50 percent, a current mode control circuit and a method of current-mode controlling the power supply. In one embodiment, the current mode control circuit, includes: (1) an interconverter current transformer, coupled to an input of the power supply, that senses an input current of the power supply and (2) a controller, coupled to the current transformer, that moderates the duty cycle of the first and second switches as a function of the input current to cause the first and second converters to share an output current of the power supply.

21 Claims, 5 Drawing Sheets

CURRENT MODE CONTROL CIRCUIT FOR PARALLELED POWER SUPPLY AND METHOD OF OPERATION THEREOF

TECHNICAL FIELD OF THE INVENTION

The present invention is directed, in general, to power conversion and, more specifically, to a current mode control circuit and method of controlling parallel-coupled power supplies employing the current mode control circuit.

BACKGROUND OF THE INVENTION

In the design of DC/DC board mounted power supplies, the maximum output current of the power supply generally has a direct effect on the size of the power supply. The available space, more particular the height, for the power supply is becoming increasingly limited as equipment manufacturers continue to respond to their customers' demands for more power in a smaller "packet." One significant limitation in the reduction of the DC/DC board mounted power supplies is the power transformer employed to step-up or, more commonly, step-down a DC input voltage to the required DC output voltage needed to power the equipment load. Reducing the size of the power transformer typically has a corresponding effect of reducing the maximum output current of the power supply.

One conventional approach to overcome the above-described limitations has been to replace the single power transformer with multiple smaller power transformers. Additionally, multiple power converters with smaller power transformers may be parallel-coupled to provide a single output; the maximum output current is a combination of the maximum output current of each individual power converter. This topology provides flexibility in the design of board mounted power supply in that the number of constituent converters can be raised or lowered depending on the equipment's current load requirement.

The use of parallel-coupled converters in a power supply, however, is not without concerns. One important consideration is the current balance between the parallel-coupled converters. For example, if a power supply has two parallel-coupled converters, typically each converter is designed to deliver half of the load current. In the event that one of the converters is not delivering half of the load current (e.g., a quarter of the load current), the other converter has to "make up" the difference. The problem arises when the converter is forced to deliver a current at or above its design output load current; the stress and heat from prolonged use may damage or, at the very least, shorten the operational life of the converter. Additionally, a converter that is forced to compensate for another converter may not be able to provide the required current (i.e., the current exceeds the output current capacity of the converter). In this event, the load equipment may not function properly, if at all.

A conventional approach to balancing the currents in the parallel-coupled converters is to employ current sensing resistors (a current shunt) in each converter, to sense the load current. The sensed load currents are then compared to one another to provide an "equalizing" signal that is used to adjust the operation of the converters to balance the output currents therefrom. To adequately balance the currents, the resistance values of the current shunt must be designed within very "tight" tolerances. To design the resistors within tight tolerances, however, is typically costly and results in a more expensive power supply design.

Accordingly, what is needed in the art is a control system for a power supply having parallel-coupled converters that overcomes the above-described limitations.

SUMMARY OF THE INVENTION

To overcome the deficiencies in the prior art, the present invention provides for use with a power supply including first and second parallel-coupled converters having interleaved first and second switches, respectively, the first and second switches limited to a duty cycle of less than about 50 percent, a current mode control circuit and a method of current-mode controlling the power supply. In one embodiment, the current mode control circuit, includes: (1) an interconverter current transformer, coupled to an input of the power supply, that senses an input current of the power supply and (2) a controller, coupled to the current transformer, that moderates the duty cycle of the first and second switches as a function of the input current to cause the first and second converters to share an output current of the power supply.

The present invention introduces a control circuit for an internally-paralleled power supply that employs peak current mode control. An interconverter current transformer senses the input current of the power supply; a controller employs that information to moderate the duty cycle of switches for multiple power trains of the power supply. The control circuit, therefore, induces the parallel-coupled converters to share the output current of the power supply.

In one embodiment of the present invention, the current transformer includes first and second primary windings couplable to the first and second converters, respectively. The first primary winding is configurable to have an opposing polarity with respect to the second primary winding.

In one embodiment of the present invention, the controller moderates a duty cycle of a plurality of switches in the first and second converters. The control circuit is capable of controlling multiple switches of the parallel-coupled converters to achieve a balanced output from each converter.

In one embodiment of the present invention, the first and second converters include first and second input storage devices, respectively. In an embodiment to be illustrated and described, the storage devices are capacitors. Of course, any storage device is within the broad scope of the present invention.

In one embodiment of the present invention, the controller includes a pulse width modulation (PWM) circuit. While a PWM circuit may serve as the controller for the control circuit, other control circuits are well within the broad scope of the present invention.

In one embodiment of the present invention, the first and second power converters include first and second power transformers coupled to the first and second switches, respectively. In an embodiment to the illustrated and described, the converters include a power transformer between the power train and rectifier circuit of the converters. Of course, the power transformer is not necessary for the broad scope of the present invention.

In one embodiment of the present invention, the first and second power converters are selected from the group consisting of: a push-push converter, a buck converter and a forward converter. Other converter topologies that are capable of current mode control are also within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
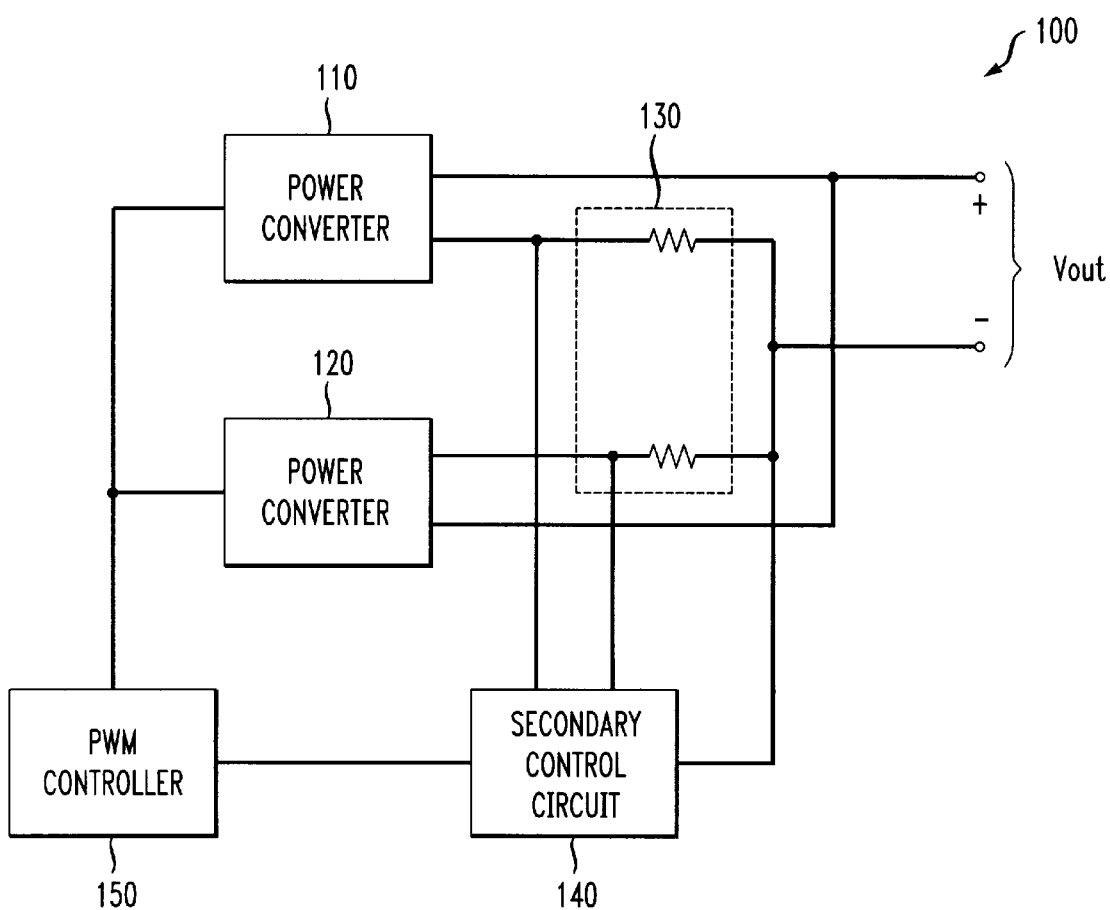
FIG. 1 illustrates a block diagram of a conventional power supply with multiple-paralleled converters.

Referring initially to FIG. 1, illustrated is a block diagram of a conventional power supply 100 with multiple-paralleled converters. The power supply 100 includes first and second converters 110, 120, current shunt 130, secondary control circuit 140 and a pulse-width-modulation (PWM) controller 150.

In the illustrated power supply 100, the current shunt 130 is used to provide a feedback signal to the PWM controller 150, which in turn, controls the switching of the switches (not shown) in the first and second power converters 110, 120. Generally, the current shunt 130 includes resistances that sense a returned load current in the first and second power converters 110, 120. The voltage drop across the resistances is measured and sent to the secondary control circuit 140, which in turn, compares the measured signals. If the signals are different, i.e., the currents in the first and second power converters 110, 120 are different, the secondary control circuit 140 will send a signal to the PWM controller 150 to adjust the duty cycles of the switches in the first and second power converters 110, 120 to balance, i.e., equalize, the currents.

As discussed previously, this method of paralleling converters requires that the current shunt, or more specifically, the resistances used in the current shunt have very "tight" tolerances. This tight tolerance requirement is necessary to ensure that the currents in the converters are balanced. Resistances with the required tight tolerances, however, are typically costly which ultimately results in a more expensive power supply design.

The present invention discloses an improved and novel control method that eliminates the above current shunt approach and replaces it with a control scheme that employs peak current mode control wherein the switches in the paralleled power converters are interleaved and operated with a maximum duty cycle of 50%. The peak current mode control "naturally" monitors the current in each converter and balances them. Furthermore, with the converters' switches limited to a 50% maximum duty cycle and interleaved, the primary main switch current sensing on the power converters may be accomplished using an interconverter current transformer (hereinafter also referred to as a current transformer).

Figure 2:
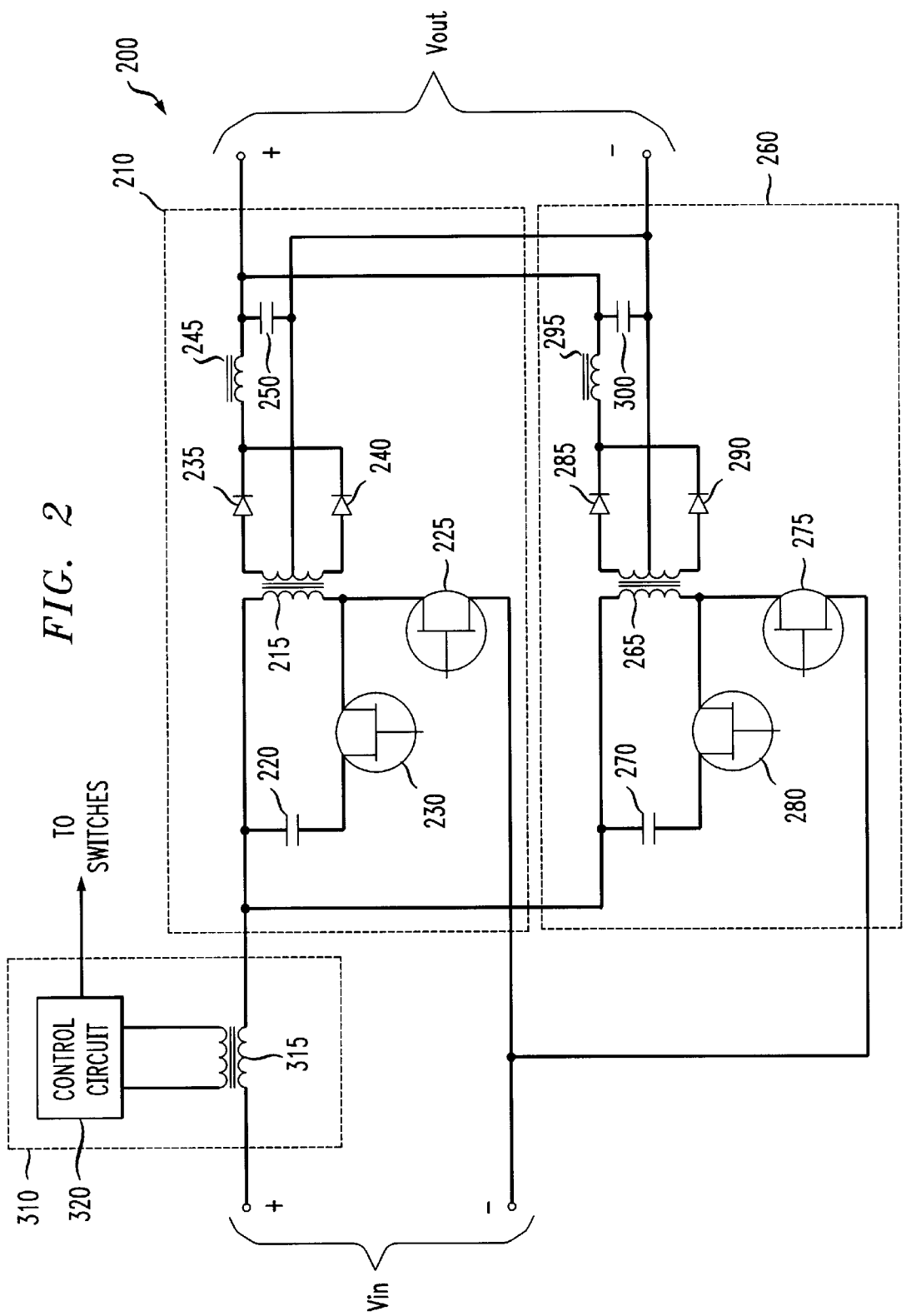
FIG. 2 illustrates a schematic diagram of an embodiment of a power supply constructed according to the principles of the present invention.

Turning now to FIG. 2, illustrated is a schematic diagram of an embodiment of a power supply 200 constructed according to the principles of the present invention. The power supply 200 includes first and second parallel-coupled converters 210, 260, which are coupled to a current mode control circuit 310. The first converter 210 includes a first power transformer 215, whose primary winding is coupled to a first switch 225, first input capacitor 220 and first clamping switch 230. The secondary winding of the first power transformer 215 is shown coupled to first and second rectifying diodes 235, 240, that are coupled to a first output inductor 245. Also shown coupled to the first output inductor 245 and center tap of the first power transformer 215 is a first output capacitor 250, which together with the first output inductor 245 form a "LC" filter.

Similarly, the second converter 260 includes a second switch 275, second input capacitor 270 and a second clamping switch 280, which are coupled to the primary winding of a second power transformer 265. Third and fourth rectifying diodes 285, 290 are coupled to the secondary winding of the second power transformer 265 and to a second output inductor 295. The second output inductor 295 is also shown coupled to a second output capacitor 250.

The current mode control circuit 310 includes an interconverter current transformer 315 coupled to a control circuit 320 (e.g., a PWM controller). As discussed above, the current transformer 315 senses an input current of the power supply 200 and the control circuit 320 takes the sensed current and provides the switching signals to the first and second clamping switches 230, 280 and the first and second switches 225, 275. The operation and construction of conventional control circuits are well known in the art and, as such, the operation of the control circuit 320 will not hereinafter be described in detail.

Although a clamped mode, also known as a push-push, converter topology is illustrated in FIG. 2, those skilled in the art should readily recognize that the illustrated power supply 200 is not limited to one particular converter topology. In other advantageous embodiments, the power supply 200 may include parallel-coupled buck or forward converters, for instance. It should be readily apparent to those skilled in the art that the teachings of the present invention may be advantageously employed, using an interconverter two-primary current transformer, in power converters that are capable of current mode control; e.g., a boost converter, as long as the current transformer's primaries are in series with the main switches.

Figure 3:
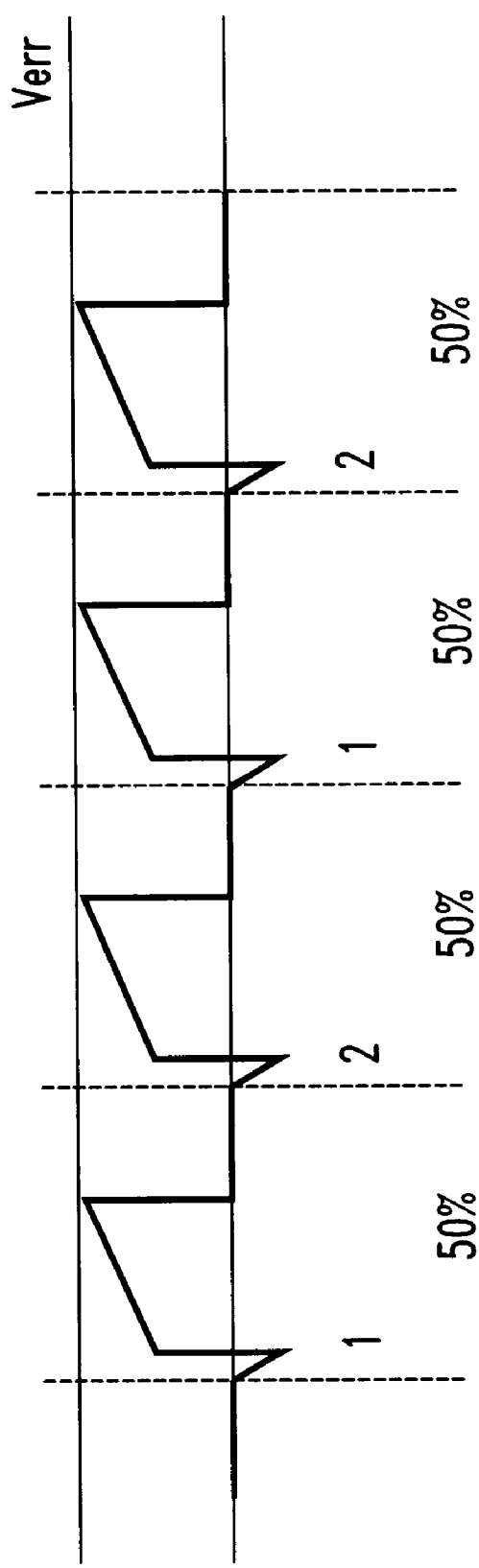
FIG. 3 illustrates an exemplary current waveform of the current transformer illustrated in FIG. 2.

Turning now to FIG. 3 (with continued reference to FIG. 2), illustrated is an exemplary current waveform of the current transformer 315 illustrated in FIG. 2. The current waveform is a combination of the currents through the first and second switches 225, 275. With the duty cycles of the first and second switches 225, 275 less than 50% and interleaved, the resulting currents through the first and second switches 225, 275 are depicted by the identifiers "1" and "2," respectively. The negative currents shown in each switching cycle are the zero-voltage-switching (ZVS) currents immediately preceding the switching-on of the first and second switches 225, 275; during the period when the first and second switches are OFF, i.e., not conducting, the current transformer 315 is reset. The peak current signals (depicted by Verr in FIG. 3) are provided to the control circuit 320 to balance the current in the first and second converters 210, 260. The peak current signal Verr is also used to provide overcurrent protection for the power supply 200. It should be pointed out that the currents through the first and second converters 210, 260 never overlap because of the less than 50% duty cycles of the interleaved first and second switches 225, 275, allowing the elimination of the current shunt used in conventional power supplies.

In the present invention, the tolerance of the current balance between the first and second converters 210, 260 is primarily dependent on the tolerance of the primary magnetic inductances of the first and second power transformers 215,265. The primary magnetic inductances of the power transformers 215, 265 shape the slope of the current signal illustrated in FIG. 3. In transformer gap core design, the magnetizing inductances of the power transformers 215, 265 are dependent on the gap tolerance; the gap tolerance change in value is proportional to the inductance change. The relationship may be described in greater detail by referring to FIG. 4.

Figure 4:
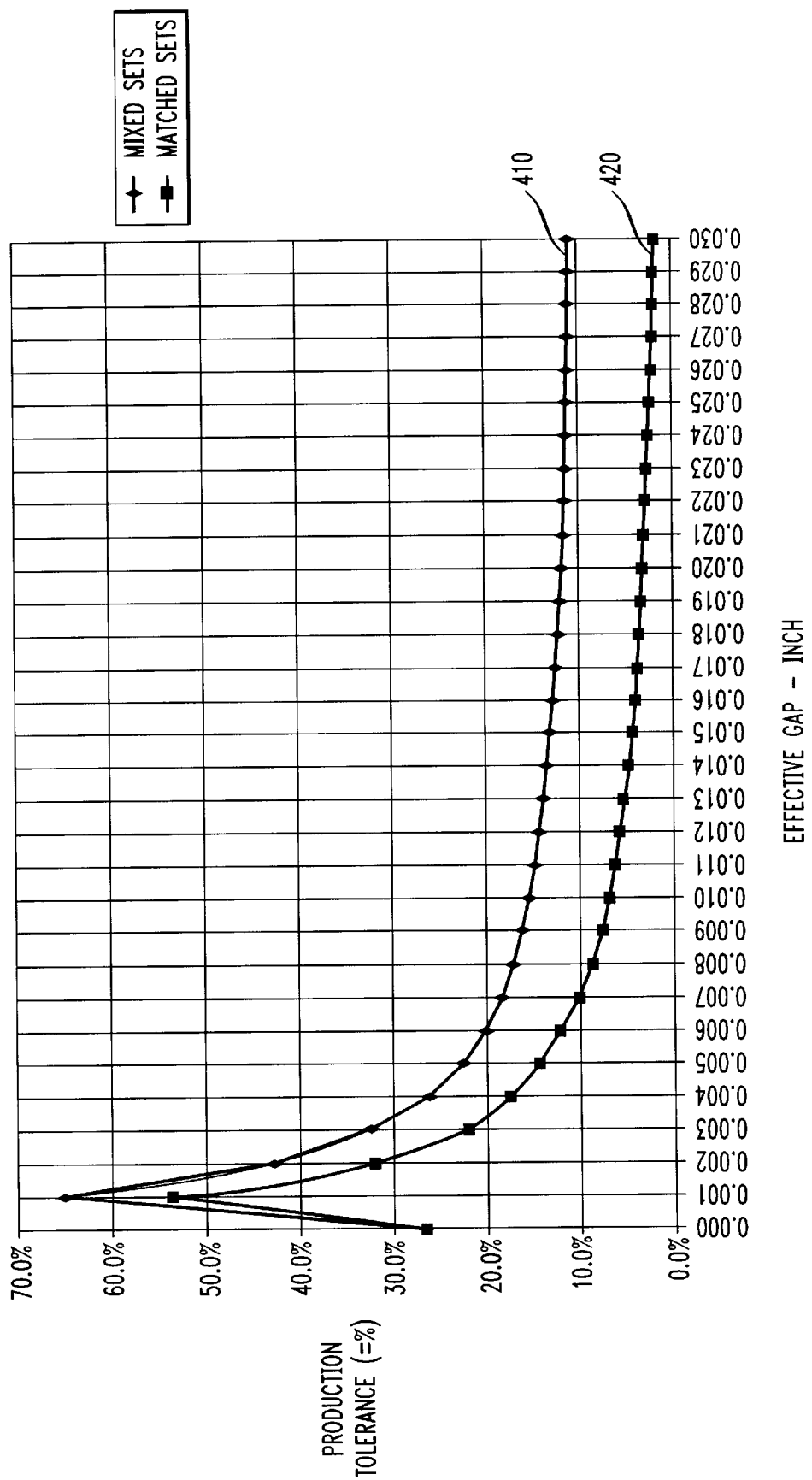
FIG. 4 illustrates exemplary test results of production tolerance versus core gaps of mixed sets of transformers and matched sets of transformers.

Turning now to FIG. 4, illustrated are exemplary test results of production tolerance versus core gaps of mixed sets of transformers and matched sets of transformers. A first curve 410 represents the results for a mixed set of transformers and a second curve 420 represents the results for a matched set of transformers. FIG. 4 demonstrates that for both matched and mixed sets, when the gap is increased, the tolerance becomes "tighter." For example, if matched cores are used, i.e., cores manufactured on the same day, using the same materials and using the same manufacturing process, when the gap is about 15 mil, the tolerance is reduced to about 5%. Thus, if each converter, e.g., first and second converters 210, 260 in FIG. 2, has a current rating of 30A, the maximum current imbalance will be about 1.5A. Furthermore, if ZVS is required, the reduced magnetizing inductance (increased gap) may be used to help satisfy a clamping mode design requirement where the magnetizing current is greater than the reflected output current (Im>Ion).

The peak current control employed in the present invention, generally, increases the converters loop gain bandwidth, while limiting the maximum duty cycle also limits the response of the converters. The resulting dynamic response is substantially the same as in conventional power supplies with parallel-coupled converters. The present invention's power transformer power loss also does not increase, in any significant sense, because while higher root-mean-square (RMS) current causes higher copper losses, the core losses are reduced at the same time from the lower duty cycle employed.

Figure 5:
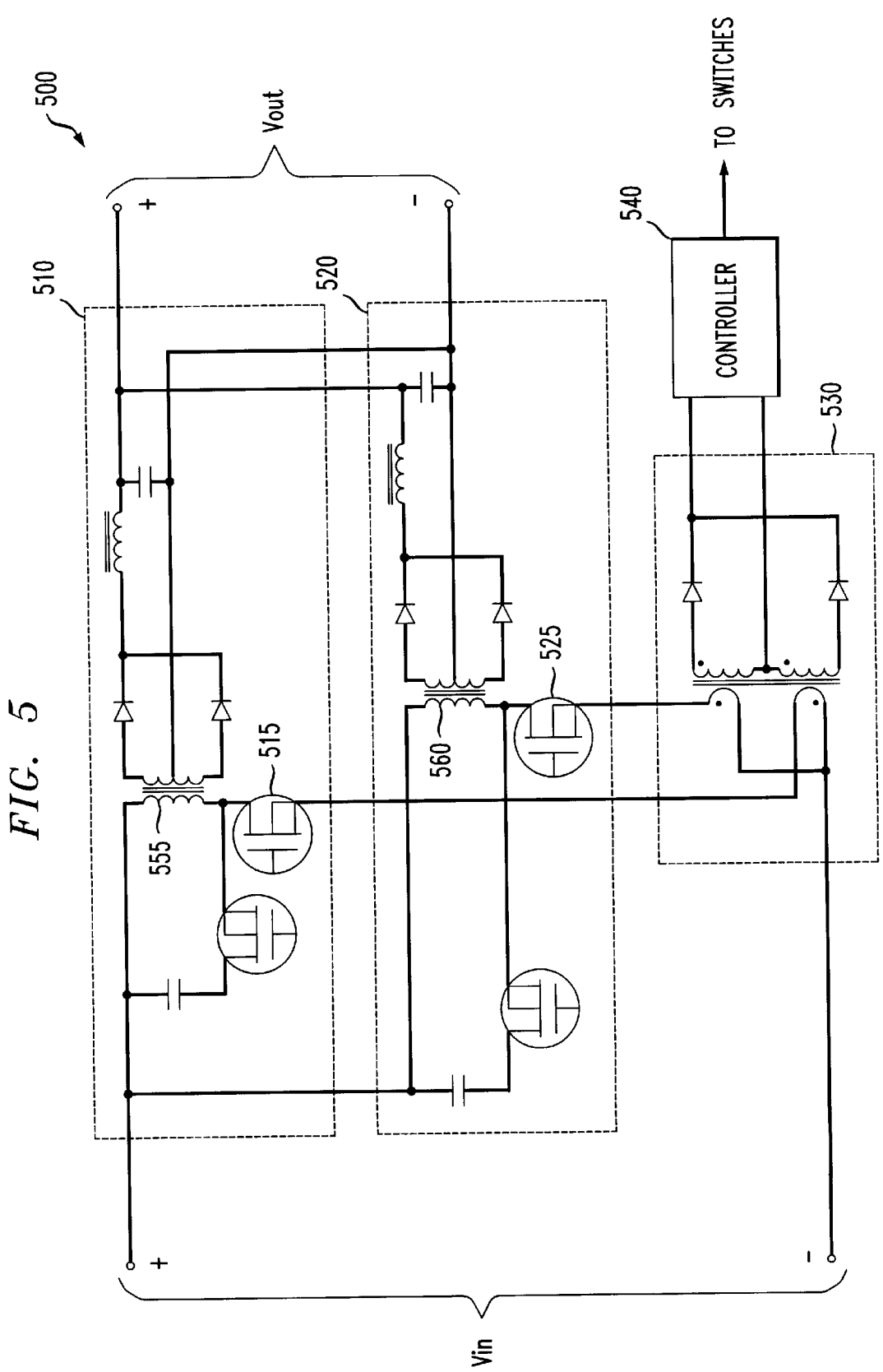
FIG. 5 illustrates a schematic diagram of another embodiment of a parallel-coupled power supply constructed according to the principles of the present invention.

Turning now to FIG. 5, illustrated is a schematic diagram of another embodiment of a parallel-coupled power supply 500 constructed according to the principles of the present invention. The power supply 500 includes a first and second converter 510, 520 with a first and second switch 515, 525, respectively. The first and second converter 510, 520 are coupled to a current transformer 530 that provides a sensed current signal to a control circuit 540. The current transformer 530 and control circuit 540 form an embodiment of a current mode control circuit constructed according to the principles of the present invention. The control circuit 540 generates a control signal, from the sensed current signal, that is used to control the switching of the switches in the first and second converters 510, 520. In the illustrated embodiment, the current transformer 530 is a two-primary current transformer that configures the primary winding of the power transformer 555 of the first converter 510 to have an opposite polarity with respect to the primary winding of the power transformer 560 of the second converter 520. The opposing polarity configuration allows the flux in the current transformer 530 to be reset using the alternating current signal. The allows the duty cycle of the first and second switches 515, 525 to be as large as 50%.

From the above, it is apparent that the present invention provides a current mode control circuit that includes: (1) an interconverter current transformer, coupled to an input of the power supply, that senses an input current of the power supply and (2) a controller, coupled to the current transformer, that moderates the duty cycle of the first and second switches as a function of the input current to cause the first and second converters to share an output current of the power supply.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa. Similarly, although the power transformers having a single core and a single primary winding has been illustrated, other configurations, such as magnetic devices having multiple primary windings or multiple cores, may be used to accomplish essentially the same results disclosed by the present invention.

For a better understanding of power electronics, power converter topologies, such as buck-based power converter, and control circuits, see: *Principles of Power Electronics*, by J. Kassakian and M. Schlecht, Addison-Wesley Publishing Company (1991), which is incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power supply including first and second parallel-coupled converters having first and second switches, respectively, that operate in an interleaved manner, said first and second switches limited to a duty cycle of less than about 50 percent, a current mode control circuit, comprising:

an interconverter current transformer, coupled to an input of said power supply, that senses an input current of said power supply, inputs of said first and second converters being coupled in parallel; and a controller, coupled to said current transformer, that moderates said duty cycle of said first and second switches as a function of said input current to cause said first and second converters to share an output current of said power supply.

2. The circuit as recited in claim 1 wherein said current transformer comprises first and second primary windings coupled to said first and second converters, respectively, said first primary winding having an opposing polarity with respect to said second primary winding.

3. The circuit as recited in claim 1 wherein said controller moderates duty cycles of a plurality of switches in said first and second converters.

4. The power supply as recited in claim 1 wherein said first and second converters comprise first and second input storage devices, respectively.

5. The circuit as recited in claim 1 wherein said controller comprises a pulse width modulation (PWM) circuit.

6. The circuit as recited in claim 1 wherein said first and second converters comprise first and second power transformers coupled to said first and second switches, respectively.

7. The circuit as recited in claim 1 wherein said first and second converters are selected from the group consisting of:
   a push-push converter,
   a buck converter, and
   a forward converter.

8. For use with a power supply including first and second parallel-coupled converters having first and second switches, respectively, that operate in an interleaved manner, said first and second switches limited to a duty cycle of less than about 50 percent, a method of current-mode controlling said power supply, comprising:
   coupling inputs of said first and second converters in parallel;
   sensing an input current of said power supply with an interconverter current transformer coupled to an input of said power supply; and
   moderating said duty cycle of said first and second switches as a function of said input current to cause said first and second converters to share an output current of said power supply.

9. The method as recited in claim 8 wherein said current transformer comprises first and second primary windings coupled to said first and second converters, respectively, said first primary winding having an opposing polarity with respect to said second primary winding.

10. The method as recited in claim 8 wherein moderating comprises the step of moderating duty cycles of a plurality of switches in said first and second converters.

11. The method as recited in claim 8 further comprising temporarily storing said input current in first and second input storage devices.

12. The method as recited in claim 8 wherein said moderating is performed by a controller.

13. The method as recited in claim 8 further comprising transferring said output current through first and second power transformers coupled to said first and second switches.

14. The method as recited in claim 8 wherein said first and second converters are selected from the group consisting of:
   a push-push converter,
   a buck converter, and
   a forward converter.

15. A power supply, comprising:
   first and second parallel-coupled converters having first and second switches, respectively, that operate in an interleaved manner, inputs of said first and second converters being coupled in parallel, said first and second switches limited to a duty cycle of less than about 50 percent; and
   a current mode control circuit, including:
      an interconverter current transformer, coupled to an input of said power supply, that senses an input current of said power supply, and
      a controller, coupled to said current transformer, that moderates said duty cycle of said first and second switches as a function of said input current to cause said first and second converters to share an output current of said power supply.

16. The power supply as recited in claim 15 wherein said current transformer comprises first and second primary windings coupled to said first and second converters, respectively, said first primary winding having an opposing polarity with respect to said second primary winding.

17. The power supply as recited in claim 15 wherein said controller moderates duty cycles of a plurality of switches in said first and second converters.

18. The power supply as recited in claim 15 wherein said first and second converters further comprise first and second input storage devices, respectively.

19. The power supply as recited in claim 15 wherein said controller comprises a pulse width modulation (PWM) circuit.

20. The power supply as recited in claim 15 wherein said first and second converters comprise first and second power transformers coupled to said first and second switches, respectively.

21. The power supply as recited in claim 15 wherein said first and second converters are selected from the group consisting of:
   a push-push converter,
   a buck converter, and
   a forward converter.

* * * * *